Patented Aug. 12, 1930

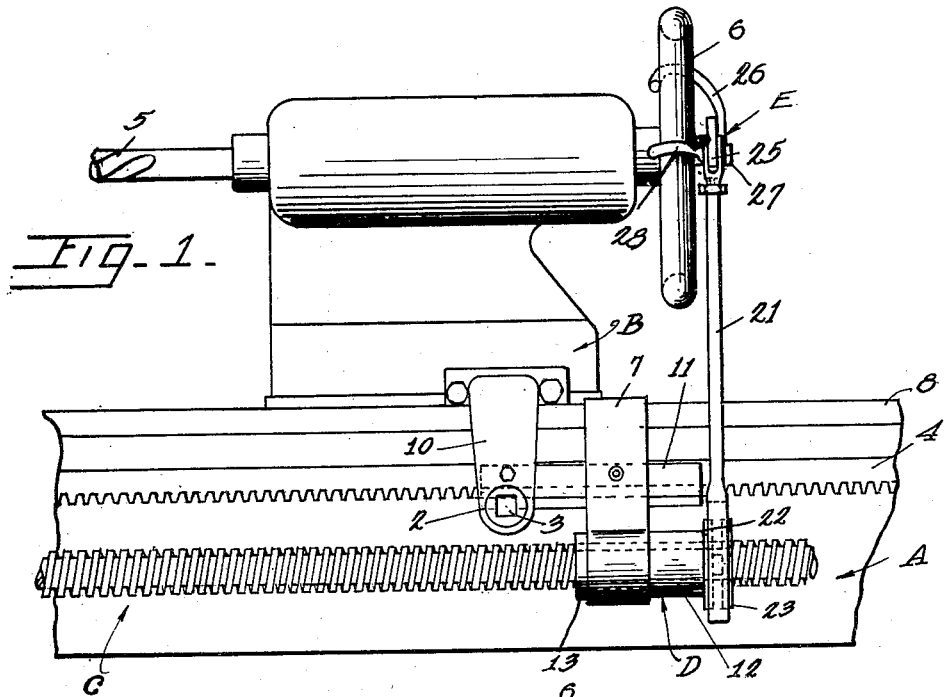
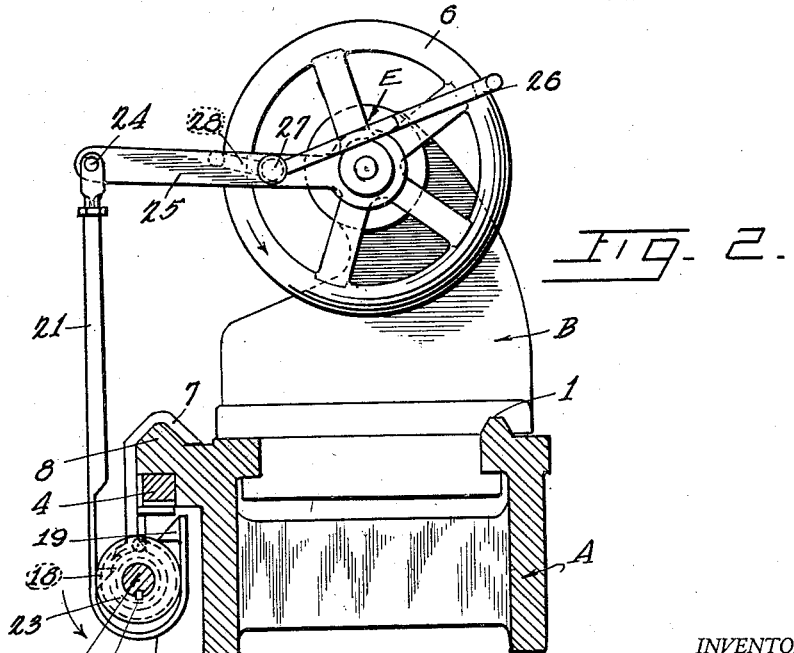

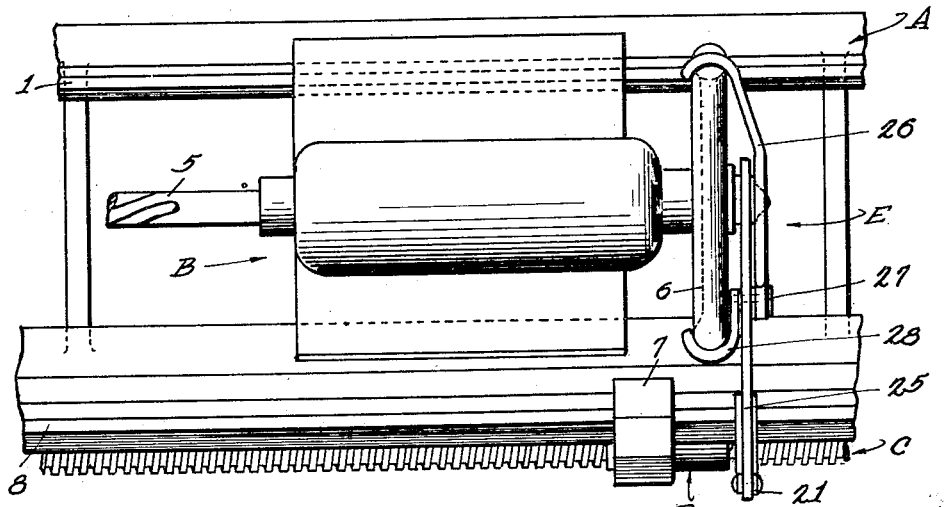
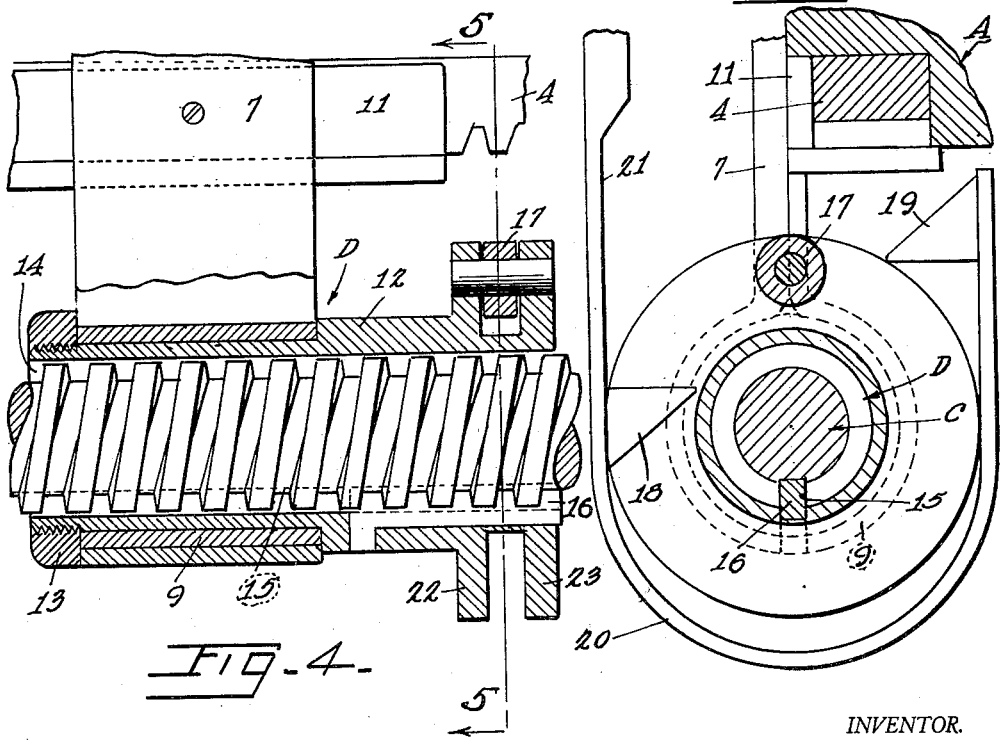

1,772,940

UNITED STATES PATENT OFFICE

EMIL G. FORSBERG, OF COALINGA, CALIFORNIA

LATHE-DRIVEN TAILSTOCK FEED

Application filed June 8, 1929. Serial No. 369,423.

My invention relates to improvements in lathe-driven tailstock feeds, and it consists in the combinations, constructions and arrangements hereinafter described and claimed.

An object of my invention is to provide a lathe-driven tailstock feed which may be applied to a standard lathe for automatically advancing the tailstock during the drilling operation. No alteration is necessary in the lathe when applying the device.

A further object of my invention is to provide a device of the type described which is designed to rotate the wheel of the tailstock step by step in much the same manner as when the wheel is rotated by hand.

Other objects and advantages will appear as the specification proceeds, and the novel features of the invention will be particularly pointed out in the appended claims.

My invention is illustrated in the accompanying drawing, in which

Figure 1 is a side elevation of the device showing it operatively applied to the tailstock of a lathe;

Figure 2 is an end elevation of the device;

Figure 3 is a top plan view;

Figure 4 is a vertical section through a part of the attachment; and

Figure 5 is a section along the line 5—5 of Figure 4.

In carrying out my invention, I make use of a lathe frame indicated generally at A, a tailstock indicated at B, and a lathe feed screw indicated at C. The screw is rotated by the usual lathe mechanism (not shown), and the tailstock is advanced upon the lathe V rail 1 by a pinion 2 (see Figure 1) that has a socket 3 therein for receiving a wrench (not shown). The pinion rides in a lathe bed rack 4 which is secured to the frame A. The pinion 2 is used for major adjustment, while the drill 5 is advanced by means of a hand wheel 6 after the major adjustment has been made. The work (not shown) is rotated by the lathe head and is brought into contact with the drill 5.

The means for automatically advancing the drill 5 comprises a feed screw cam indicated generally at D and a friction ratchet indicated at E, the ratchet being operatively connected to the feed screw cam. I will first describe the cam.

A strap 7 is slidably mounted on a rail 8 (see Figure 2) and this strap supports a cam bushing 9 (see Figure 4). The strap is connected to an arm 10 that carries the pinion 2, and this connection is effected by means of an L-shaped member 11 that has one of its sides secured to the members 7 and 10 and its underside bearing against the rack 4. The connecting member 11 also performs the additional function of preventing vertical movement of the strap 7.

Within the bushing 9 I rotatably mount a sleeve 12, and this sleeve is secured against longitudinal movement with respect to the bushing 9 by means of a nut 13. The sleeve has a bore 14 large enough in diameter to loosely receive a portion of the feed screw C. The feed screw has a keyway 15 extending throughout its length, and a key 16 carried by the sleeve 12 is slidably disposed in the keyway. It will be seen from this construction that a rotation of the screw C will rotate the sleeve 12, and that the strap 7 prevents longitudinal movement of the sleeve on the screw. The sleeve, however, can be advanced on the screw when the strap is moved.

The sleeve carries a roller 17 (see Figure 4), and this roller is designed to contact with two lugs 18 and 19, these lugs being carried by the rounded end 20 of a rod 21. The roller 17 is disposed between two flanges 22 and 23 that are integral with the sleeve 12, and the lugs 18 and 19 are designed to move between the flanges.

Each lug is provided with a straight side that is contacted by the roller 17. The roller 17, upon striking the lug 18, will pull the rod 21 downwardly, and then, upon striking the lug 19, will push the rod upwardly. In this way the roller will impart a vertical reciprocating movement to the rod 21.

In Figures 1 and 2, I show the rod 21 as being pivotally secured at 24 to an arm 25 of the friction ratchet E. The other end of the arm is rotatably mounted on the hub of the wheel 6 and rocks on the hub as the rod 21 is moved up and down.

A hook 26 is pivotally secured to the arm 25 at 27, and a second hook 28 is also pivotally secured to the arm at the same place. The sum of the lengths of the two hooks is slightly less than the diameter of the wheel 6, and this will cause the hooks to engage with the wheel in the manner shown in Figure 2.

From the foregoing description of the various parts of the device, the operation thereof may be readily understood.

The tailstock B is adjusted in the manner already described, and this will move the mechanisms D and E therewith. The lathe may now be operated, and the rotation of the feed screw C will cause the rod 21 to reciprocate vertically in the manner already described. This will cause the arm 25 to rock on the wheel hub. The downward movement of the arm will carry with it the hooks 26 and 28 until these hooks frictionally engage with the wheel 6, whereupon further downward movement of the arm 25 will rotate the wheel 6 in the direction of the arrow shown in Figure 2. The downward movement is followed by an upward movement of the arm 25, and this will loosen the hooks from their gripping relation with the wheel and will swing them in a clockwise direction around the wheel into a new gripping position. As soon as the rod 21 again starts to move downwardly, the hooks will engage with the wheel and will swing it counterclockwise through a predetermined distance.

It will be seen that the reciprocating movement of the rod 21 will impart an intermittent counterclockwise movement to the wheel 6. This will slowly advance the drill 5 into the work, and will do away with the necessity of the operator manually actuating the wheel.

Although I have shown and described one embodiment of my invention, it is to be understood that the same is susceptible of various changes, and I reserve the right to employ such changes as may come within the scope of the invention as claimed.

I claim:

1. The combination with a lathe having a tailstock and a hand wheel carried by the tailstock, of a friction ratchet operatively connected to said hand wheel, said ratchet comprising an arm swingable on the hub of the wheel, and hooks pivotally carried by the arm and engaging with the periphery of the wheel when the arm is moved in one direction, and means for oscillating the arm.

2. The combination with a lathe having a tailstock and a hand wheel therefor, of a screw operated by the lathe and having a longitudinally-extending keyway therein, a sleeve mounted on said screw and having a bore large enough to loosely receive the threads of the screw, a key carried by said sleeve and being slidable in the keyway, a cam carried by the sleeve, a rod reciprocated by said cam, and a friction ratchet operatively connected to said wheel and to said rod.

3. The combination with a lathe having a tailstock and a hand wheel therefor, of a screw operated by the lathe and having a longitudinally-extending keyway therein, a sleeve mounted on said screw and having a bore large enough to loosely receive the threads of the screw, a key carried by said sleeve and being slidable in the keyway, a cam carried by the sleeve, a rod reciprocated by said cam, a friction ratchet operatively connected to said wheel and to said rod, and a strap supporting the sleeve and being slidably secured to the lathe for preventing lateral movement of the screw.

4. The combination with a lathe having a tailstock and a hand wheel therefor, of a screw operated by the lathe and having a longitudinally-extending keyway therein, a sleeve mounted on said screw and having a bore large enough to loosely receive the threads of the screw, a key carried by said sleeve and being slidable in the keyway, a cam carried by the sleeve, a rod reciprocated by said cam, a friction ratchet operatively connected to said wheel and to said rod, a strap supporting the sleeve and being slidably secured to the lathe for preventing lateral movement of the screw, and means connecting the tailstock with the strap for causing them both to be moved as a unit.

EMIL G. FORSBERG.